(12) United States Patent
Wilkinson

(10) Patent No.: US 6,296,328 B1
(45) Date of Patent: Oct. 2, 2001

(54) TRACKS FOR ALL TERRAIN VEHICLES

(76) Inventor: Stephen Wilkinson, R.R. #1, S12, Box 3, Comp. 2, Sayward, BC (CA), V0P 1R0

( * ) Notice: Subject to any disclaimer, the term of this patent is extended or adjusted under 35 U.S.C. 154(b) by 0 days.

(21) Appl. No.: 09/339,919

(22) Filed: Jun. 25, 1999

Related U.S. Application Data

(60) Provisional application No. 60/091,717, filed on Jul. 6, 1998.

(51) Int. Cl.$^7$ .................................................. B62D 55/205
(52) U.S. Cl. .......................................... 305/158; 305/165
(58) Field of Search .................................. 305/157, 158, 305/159, 160, 165, 186, 178, 19, 34; 301/43

(56) References Cited

U.S. PATENT DOCUMENTS

| | | | |
|---|---|---|---|
| 1,639,536 | * 8/1927 | Saives | 305/158 |
| 2,385,453 | * 9/1945 | Leguillon | 305/158 |
| 2,450,598 | * 10/1948 | Kerr | 305/7 |
| 2,887,343 | * 5/1959 | West | 305/165 |
| 3,170,533 | 2/1965 | Fewel et al. | 180/9.2 |
| 3,313,263 | 4/1967 | Ferguson | 115/1 |
| 3,602,364 | 8/1971 | Maglio et al. | 198/193 |
| 3,637,266 | * 1/1972 | Busse | 305/158 |
| 3,712,688 | * 1/1973 | Russell | 305/160 |
| 3,948,707 | 4/1976 | Grawley et al. | 156/137 |
| 4,056,289 | * 11/1977 | Gilliland | 305/158 |
| 4,089,565 | 5/1978 | Loegering et al. | 305/45 |
| 4,119,356 | * 10/1978 | Pohjola | 305/158 |
| 4,762,377 | 8/1988 | Burmeister | 305/34 |
| 4,810,043 | 3/1989 | McIntosh | 305/15 |
| 5,058,963 | * 10/1991 | Wiesner et al. | 305/158 |
| 5,284,387 | 2/1994 | Loegering | 305/56 |
| 5,388,624 | 2/1995 | Nordström et al. | 152/185.1 |
| 5,894,900 | * 4/1999 | Yamamoto et al. | 305/165 |

FOREIGN PATENT DOCUMENTS

| | | | |
|---|---|---|---|
| 824043 | * 9/1969 | (CA) | 305/158 |
| 849411 | 8/1970 | (CA) | 305/54 |
| 962307 | 2/1975 | (CA) | 305/30 |
| 304219 | * 1/1929 | (GB) | 305/165 |

\* cited by examiner

*Primary Examiner*—S. Joseph Morano
*Assistant Examiner*—Long Bao Nguyen
(74) *Attorney, Agent, or Firm*—Antony C. Edwards

(57) ABSTRACT

The continuous, flexible, looped track for mounting on all terrain vehicle tires of the present invention includes a plurality of used tires joined together, end to end, to make a continuous flexible track. A tread surface and sidewalls of each tire of the plurality of used tires are severed through at a first location on each tire so as to form first and second faces on opposite ends of each tire segment so formed when laid flat. The tire segments are abutted end-to-end and joined together, so as to join the second face of a first tire segment to the first face of an adjacent second tire segment and so on in succession joining the plurality of used tires in end-to-end array so as to form the track. The track is formed when an inner circumference of the track is equal to an exterior tangential perimeter distance of the vehicle tires about which the track is to extend.

7 Claims, 4 Drawing Sheets

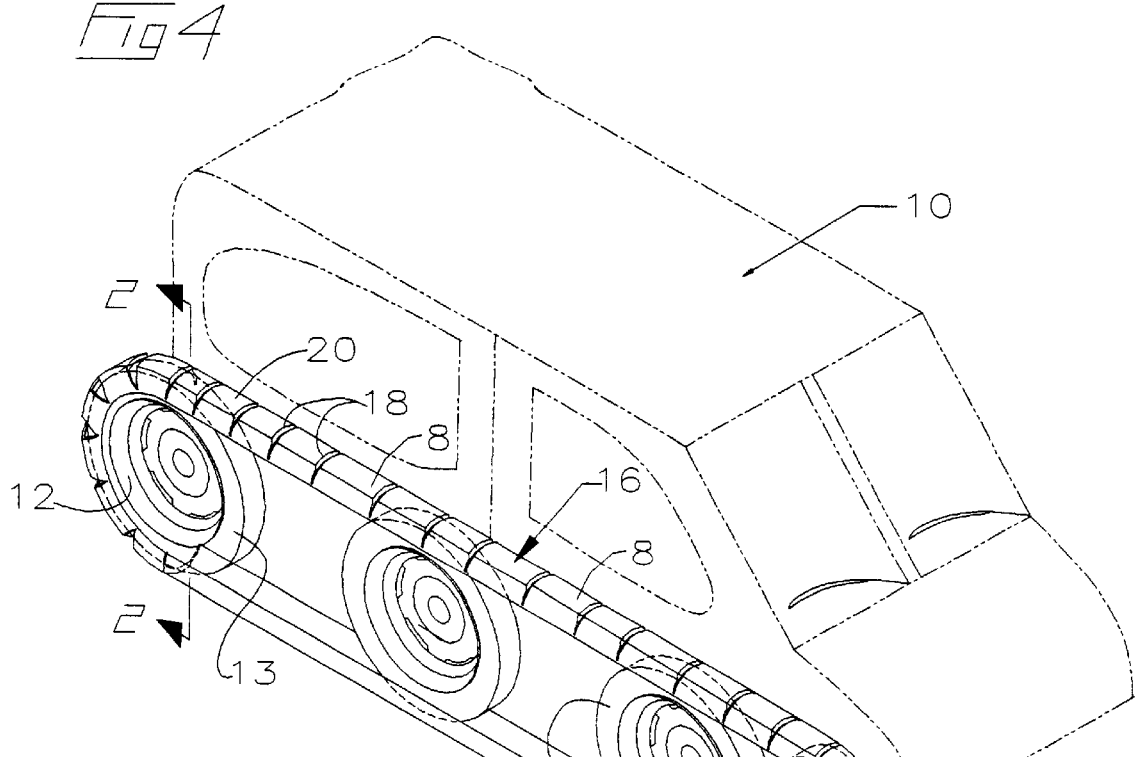
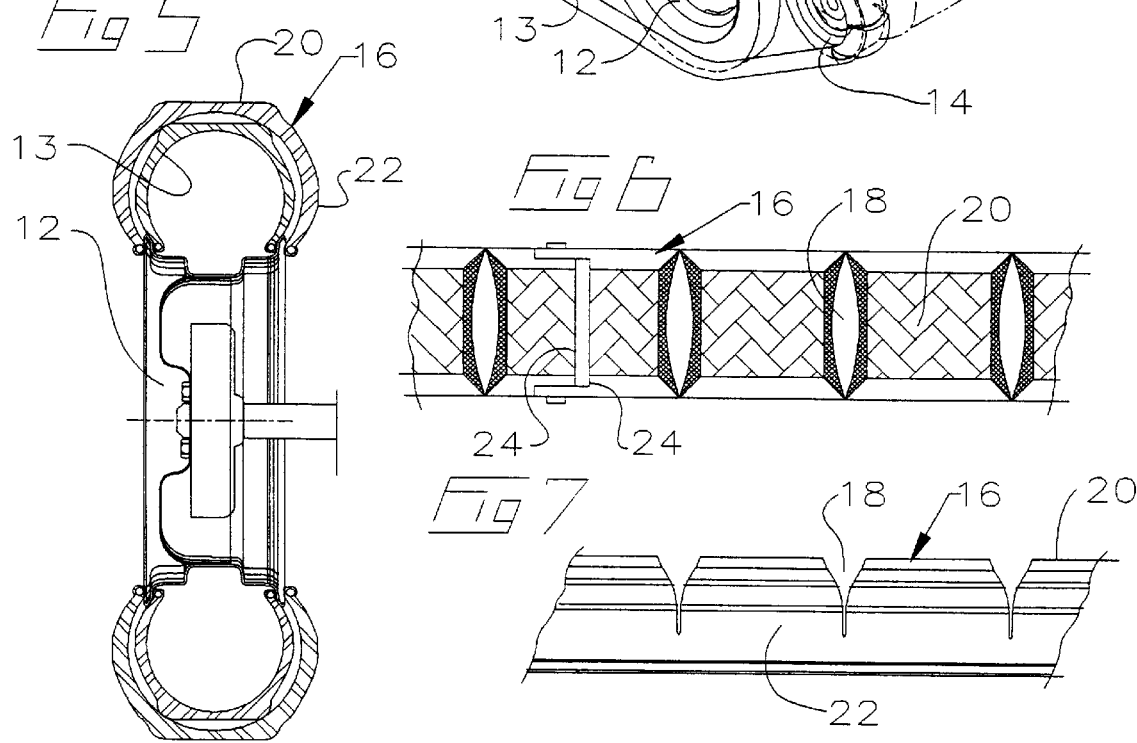

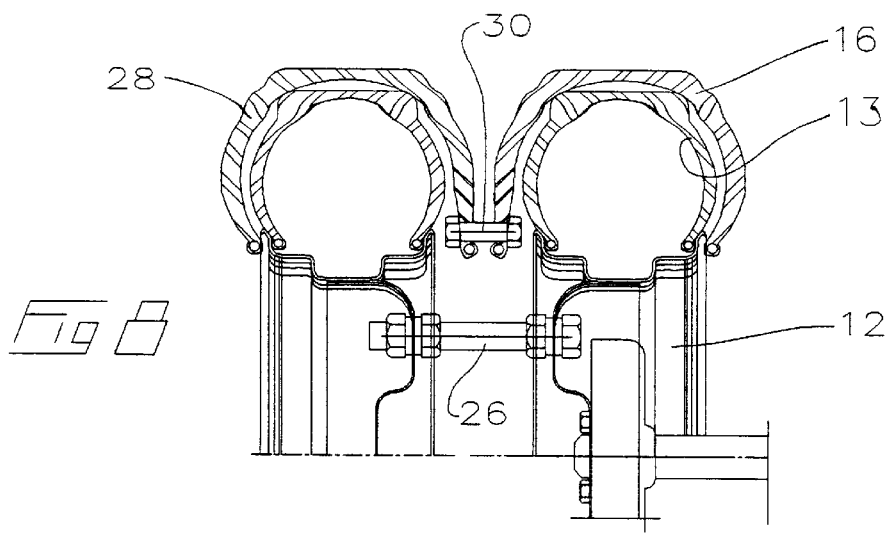
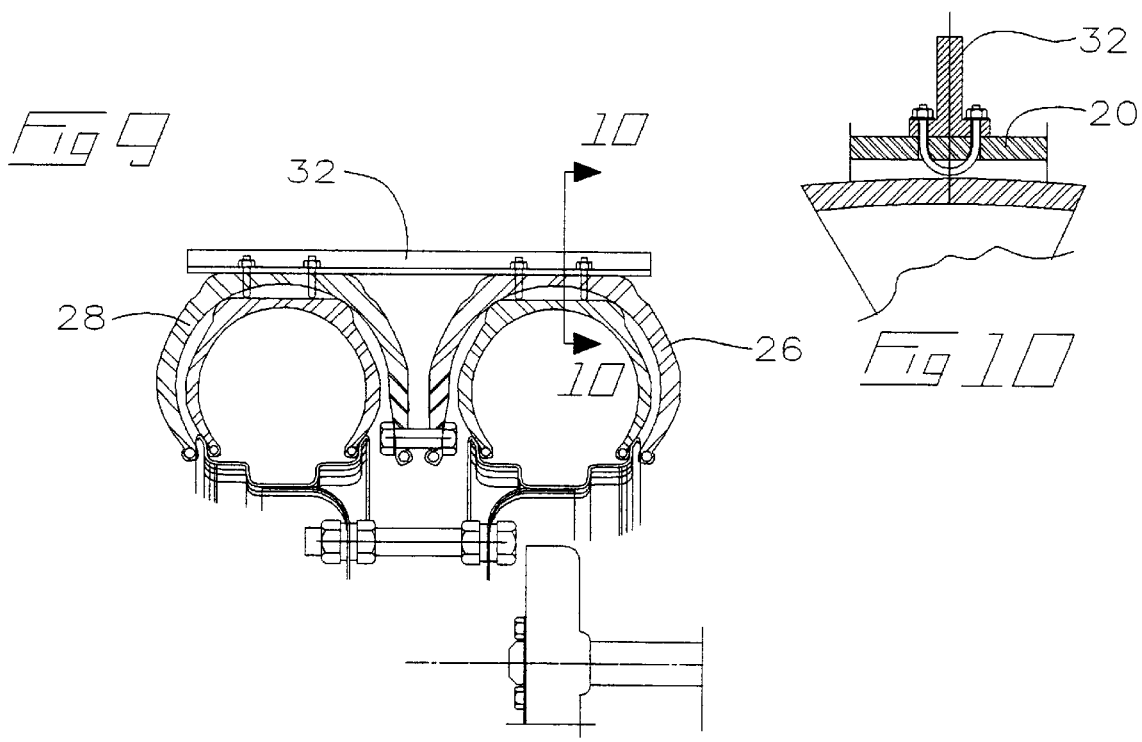

TRACKS FOR ALL TERRAIN VEHICLES

CROSS REFERENCE TO RELATED APPLICATION

This application claims priority from U.S. Provisional Patent Application No. 60/091,717 filed Jul. 6, 1998 titled Tracks for All Terrain Vehicles.

FIELD OF THE INVENTION

This invention relates to the field of tracks or belts frequently employed on military and civilian all terrain vehicles to provide traction in difficult terrain. In particular, this invention relates to a method and apparatus whereby conventional vehicle tires are cut and linked end to end and segmented so as to provide an endless track mountable over vehicle tires mounted on the vehicle.

BACKGROUND OF THE INVENTION

It is well understood and recognized that tracked vehicles have better traction than vehicles relying merely on drive wheels in muddy, sandy or otherwise difficult terrain wherein wheeled vehicles become bogged down. Consequently, there have been attempts in the prior art to modify wheeled vehicles to all terrain vehicles. One such example, of which applicant is aware, is Canadian Patent No. 962,303 which issued Feb. 4, 1975 to Russell for a modification means for changing wheeled vehicles to all terrain vehicles. Russell teaches providing a plurality of cylinders with means for affixing one each of the cylinders to the wheels of the vehicle. A plurality of flat endless belts, each having a plurality of tires affixed to the outer surface thereof in flat adjacent relationship with the endless belts affixed in overlying relationship on the cylinders so as to rotate with the wheels of the vehicle.

In the art of tracked vehicles generally, applicant is aware of the following Canadian Patents: Patent No. 580,645, which issued Aug. 4, 1959, to Benson for a Pneumatic Track; Patent No. 514,985 which issued Oct. 26, 1943, to Walker for a Pneumatically Mounted Tractor; Patent No. 580,651, which issued Aug. 4, 1959, to Eger for a Pneumatic Track; Patent No. 713,969, which issued Jul. 20, 1965, to Bonmartini for a Vehicle Track with Protected Joints; Patent No. 849,411, which issued Aug. 18, 1970, to Hartlerode for a Track Construction for a Track Laying Vehicle; Patent No. 950,947, which issued Jul. 9, 1974, to Ferguson for a Support Unit for Crawler Vehicle Track; Patent No. 1,260,994, which issued Sep. 26, 1989, to Burmeister for a Mattress Construction for Pneumatic Mattress Track System; Patent No. 1,293,757, which issued Dec. 31, 1991, to Kadela for an All Terrain Off Road Vehicle; Patent No. 797,114, which issued Oct. 22, 1968, to Ferguson for a Track Apparatus for Crawler Type Vehicles; and Patent No. 1,233,493, which issued Mar. 1, 1988, to Bertelsen for a Segmented Air Track Apparatus.

In other track related art, applicant is aware of U.S. Pat. No. 3,948,707, which issued Apr. 6, 1976, to Grawley et al for a Flexible Sealed Track Belt; U.S. Pat. No. 3,244,458, which issued to Frost for an Inflatable Endless Belt and Support Therefor; U.S. Pat. No. 3,170,533, which issued Feb. 23, 1965, to Fewel for a Vehicle with Pneumatic Support; U.S. Pat. No. 5,284,387, which issued Feb. 8, 1994, to Loegering for a Removable Flexible Track Belt and Track Section Therefore; U.S. Pat. No. 3,602,364, which issued Aug. 31, 1971, to Magleo for a Segmented Belt; U.S. Pat. No. 4,810,043, which issued to McIntosh for a Tire-Located Track; U.S. Pat. No. 4,089,565, which issued to Loegering for a Removable Track Structure for Wheeled Vehicles; U.S. Pat. No. 5,388,624, which issued Feb. 14, 1995, to Nordstrom et al for a Vehicle Driven Wheel With Tire and Track Driven Thereby.

As taught by Loegering in U.S. Pat. No. 5,284,387, the use of an endless track as a traction enhancer for wheeled vehicles is well known. Typically, such belts comprise a plurality of individual track sections that are linked together for pivotal movement with respect to adjacent track sections. These track belts have traditionally been used to obtain better overall traction for the vehicle generally, and in wet and slippery conditions particularly. Single pivot linkage mechanisms are often used where the tires of the vehicle are extremely rounded, where three or more wheels will have a flexible belt mounted to them, or where there is a long wheelbase between adjacent wheels. In those circumstances, a single pivot linkage mechanism is usually more desirable because the single pivots rock and flex less than the known double pivot linkages; that is, they are more rigid than the double or dual pivot linkage, and therefore prevent substantial side tilting of the track sections and, therefore, the vehicle tires are less likely to walk out of the track belt.

As further taught by Loegering, generally, each of the track sections include a base pad structure having an elongate shape that engages the ground during operation of the vehicle. The base pad forms a cross bar that extends between a pair of opposed side walls, which in turn extend upwardly from the base pad on opposite longitudinally spaced ends thereof. Adjacent track sections are linked together by a linkage mechanism. During operation of a vehicle utilizing such flexible belts, the vehicle tires are normally guided within the track sections by the side walls of the track section. The prior art track sections usually guide the tires by engaging the soft sidewall of the tire, resulting in side wall wear on the tire. In addition, during normal operation, the vehicle will often experience forces directed sideways to the track belt, or along the longitudinal direction of extent of the individual track sections. When experiencing these side loading forces, the tires will tend to crawl upwardly along the sidewall of the track section. This side loading of the tires into the sidewall of the track section creates wear on the tire, in particular on the tire sidewall, which is usually thinner and softer than the tire tread and thus more susceptible to wear.

On uneven terrain, such as where rocks are encountered by one side of a track section, the track belt can experience significant rocking and flexing of the individual track sections relative to adjacent track sections, or of an end of a single track section relative to the other end thereof. This rocking and flexing of the track sections also contributes to tire wear, as well as significant wear on the linkage mechanism connecting adjacent track sections. That is, when an object is encountered by one side of the track section, the track section will tend to tilt. Since it is rigidly, and often integrally attached at one end of the link, however, tilting of the track section is inhibited and the tilting load is transferred to the linkage pin, which can cause accelerated wear on the linkages. The pin in effect acts as a saw, increasing the wear. This is particularly true for single pin linkages. Known double pivot linkages are relatively more flexible, but facilitate the tire wheels walking out of the track belt.

SUMMARY OF THE INVENTION

Thus, it is an object of the present invention, to provide a simplified flexible track belt which may be formed out of readily available materials, which do not suffer from rigidity causing accelerated wear. In particular, it is an object to provide an endless track belt by recycling used tires taken from the vehicle so as to obtain not only a uniform match between the track and the vehicle tire material to reduce wear, but to provide a track sized to snugly fit over the vehicle tires by reason of the fact that the track may be constructed of the recycled vehicle tires themselves.

In summary then, the continuous, flexible, looped track for mounting on all terrain vehicle tires of the present invention includes a plurality of used tires joined together, end to end, to make a continuous flexible track. A tread surface and sidewalls of each tire of the plurality of used tires are severed through at a first location on each tire so as to form first and second faces on opposite ends of each tire segment so formed when laid flat. The tire segments are abutted end-to-end and joined together, so as to join the second face of a first tire segment to the first face of an adjacent second tire segment and so on in succession joining the plurality of used tires in end-to-end array so as to form the track. The track is formed when an inner circumference of the track is equal to an exterior tangential perimeter distance of the vehicle tires about which the track is to extend. When the array forming the track is placed about the vehicle tires so that the array snugly frictionally engage the vehicle tires, the track may be synchronously propelled along with the vehicle tires by driving at least one of the vehicle tires. The track is snugly fitted over the vehicle tires to minimize excessive wear due to slippage between the track and the vehicle tires.

Preferably the plurality of used tires are joined end-to-end in the array by attaching means that provide for flexure at each joint between adjacent tire segments in the array. Further, a spaced array of V-shaped notches may be formed in and along the tire segments, the notches extending across the tread and partially into the sidewalls thereof so as to enhance traction of the track.

Second wheels and corresponding second tires may be mounted to each of the vehicle wheels for cooperative rotation therewith. A second track may be mounted on the second tires parallel to the first track described above. The second track is a second array of tire segments joined end-to-end in a manner similar to that of the first track. The second track may be mounted to the first track by fastening of corresponding sidewalls together, for cooperative rotation therewith. In one embodiment, an abrasion resistant cleat is mounted to the tread surface at spaced intervals along the track by u-bolts so that the cleat extends outwardly of the track.

In one aspect of the present invention, an array of v-shaped notches is formed through a bead and a portion of the sidewalls of each of the tire segments.

In a further aspect, the track has a linear, longitudinally extending array of apertures formed therein centrally along the tread surface, spaced so as to be coincident with drive cogs of a drive sprocket.

BRIEF DESCRIPTION OF THE DRAWINGS

FIG. 4 is a perspective view of one form of an all terrain vehicle, which is normally equipped with drive wheels, a tensioning wheel and having the endless track of the present invention mounted thereon.

FIG. 5 is an enlarged sectional view along line 2—2 in FIG. 1.

FIG. 6 is a plan view of a portion of the track.

FIG. 7 is a side view of the track.

FIG. 8 is a sectional view similar to FIG. 1 but illustrating a double track concept fitted over dual wheels.

FIG. 9 is a view of the double track shown in FIG. 5 having a cleat attached thereto for added traction.

FIG. 10 is a detailed view of the cleat.

DETAILED DESCRIPTION OF PREFERRED EMBODIMENTS

Figure 1:
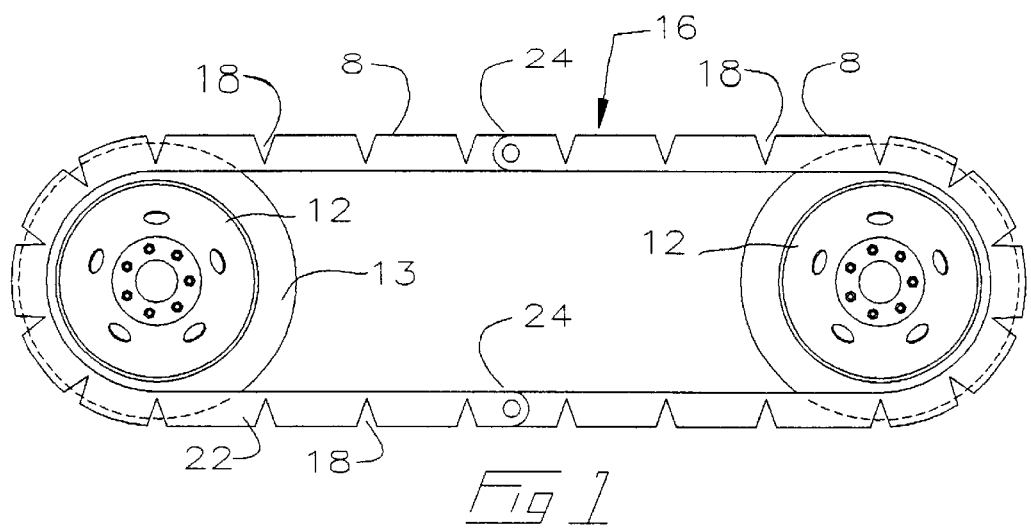
FIG. 1 is a side elevational view of a track of the present invention.
Figures 2, 3:
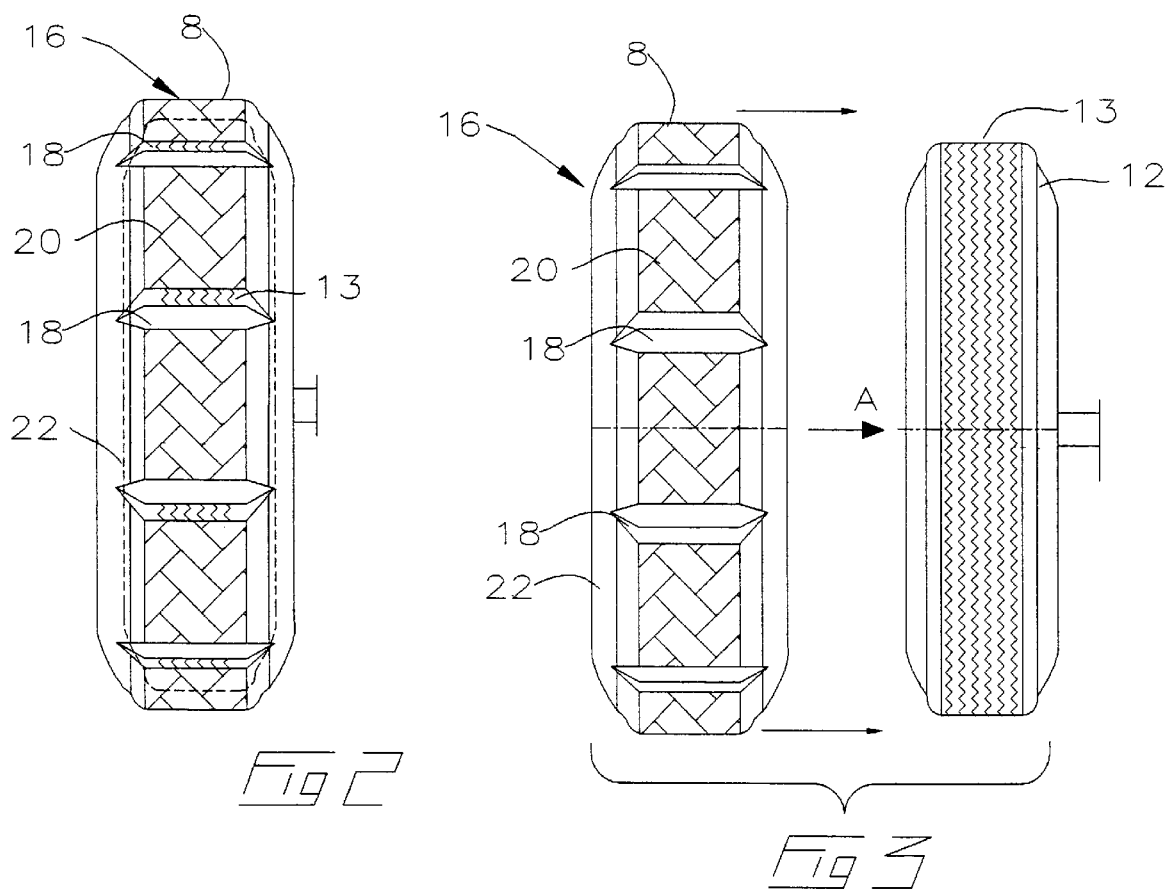
FIG. 2 is an end view of a track placed over a wheel and tire assembly or a vehicle.
FIG. 3 is an exploded view of FIG. 2.

Thus, as may be seen in FIGS. 1–3, endless track 16 is formed from recycling used recycled tires 8. In particular, a plurality of recycled tires 8 are severed completely through at a first location 24, and then notched so as to form notches 18 in radially spaced array around the circumference of recycled tire 8. The result is a segmented track such as endless track 16 when a plurality of such notched recycled tires are joined end to end by pivoting means, welding means, or other attaching means known in the art. Thus, depending on the separation between adjacent vehicle wheels 12, the circumferential distance of endless track 16 will be that required to snugly retain endless track 16 on adjacent vehicle wheels 12 and tension the endless track 16 in spanning the tangential distance between adjacent vehicle wheels 12 as best seen in FIG. 1.

As may be well understood, and as indicated in direction arrows in FIG. 3 which indicate that endless track 16 must be translated and flexed in direction A so as to snugly fit endless track 16 onto vehicle wheel 12. The result is the fitment illustrated in FIG. 2, in one preferred embodiment. To facilitate mounting of endless tack 16 onto vehicle wheels 12, endless track 16 may at be releasably securable a second location.

Otherwise, endless track 16, because it is an endless track having a fixed circumference, may be mountable onto vehicle wheels 12 by first deflating the tires 13 of vehicle wheels 12, positioning vehicle wheels 12 within the interior of endless track 16, and reinflating vehicle tires 13 until endless track 10 is snugly secured around vehicle wheels 12.

As may be seen illustrated in FIG. 4, an all terrain vehicle 10 is equipped with drive wheels 12 and tires 13 mounted thereon. A tension compensating wheel 14 is located at the forward end. Vehicle 10 has an endless track 16 of the present invention secured around drive wheels 12 and tension compensating wheel 14. The track 16 is constructed from a plurality of used vehicle tires 8.

A plurality of used recycled tires 8 have the tread 20 and sidewall 22 severed completely through at a first location 24, (see FIGS. 1, 4 and 13) so that the severed ends may be spaced apart and the tire flexed to a generally linear configuration. The severed ends of several severed tires are then butted together and securely fastened, by means well known in the art, to form an endless and flexible loop or track 16. Track 16 is then fitted over tires 13 and tensioning wheel 14 of vehicle 10. Tensioning wheel 14 may then be adjusted to position track 16 snugly over vehicle tires 13.

Where the need for additional traction is anticipated, the used tires 8 of track 16 may have V-shaped notches 18 cut into both the tread 20 and side wall 22 at regular radially spaced apart intervals. Notches 18 also assist in laying or spanning tires 8 flat as track 16 is fitted onto tires 13.

As will be noticed by referring to FIGS. 5 and 8, used tires 18 are selected which conform to the exterior dimensions of the tires 13 mounted on the all terrain vehicle. By adjustment of tensioning wheel 14, excessive slippage and wear between track 16 and vehicle tire 13 is avoided during use.

One method for increasing traction is illustrated in FIG. 8. In this example an additional wheel and tire assembly is coupled, such as by bolts 26, to existing wheel assemblies. A second endless, flexible track 28 is connected to the first track by way of bolts 30. The pair of flexible tracks are positioned over the dual wheel assemblies and the dual tension compensating wheel assemblies are adjusted to snug up the tracks. With reference to FIGS. 9 and 10, additional traction is possible by the attachment of cleat or cleats 32 to the pair of flexible tracks noted previously, by means of U-bolts or the like.

Figure 11:
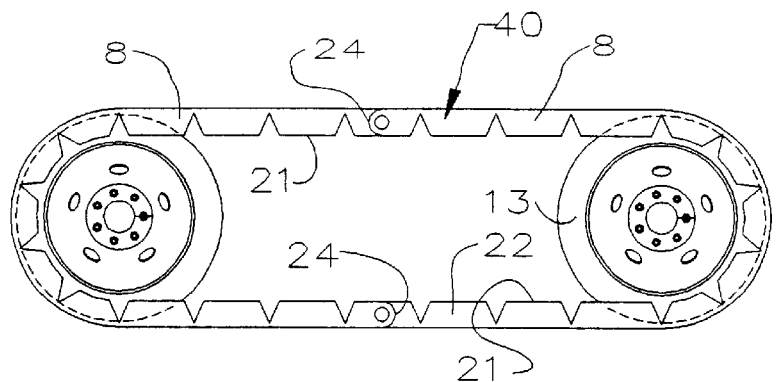
FIG. 11 is a side elevational view similar to FIG. 1 illustrating a modified endless track.
Figure 12:
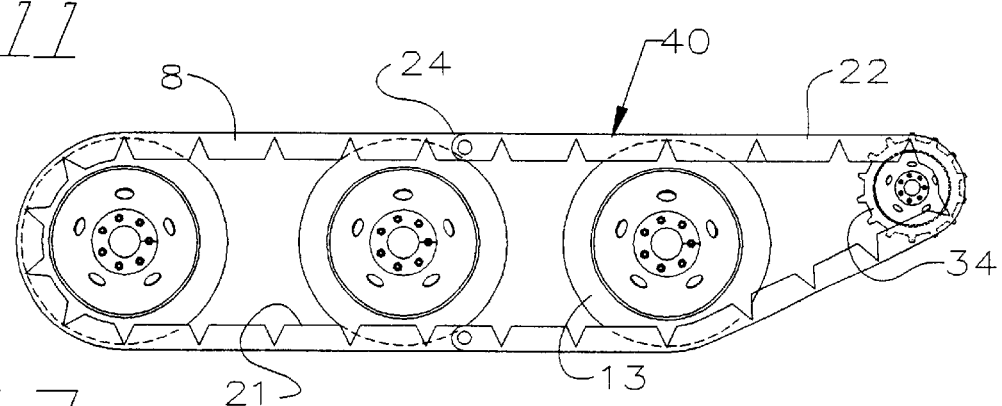
FIG. 12 is a side elevational view of the track of FIG. 11 mounted on an all terrain vehicle wherein a tensioning wheel is a drive sprocket.
Figure 13:
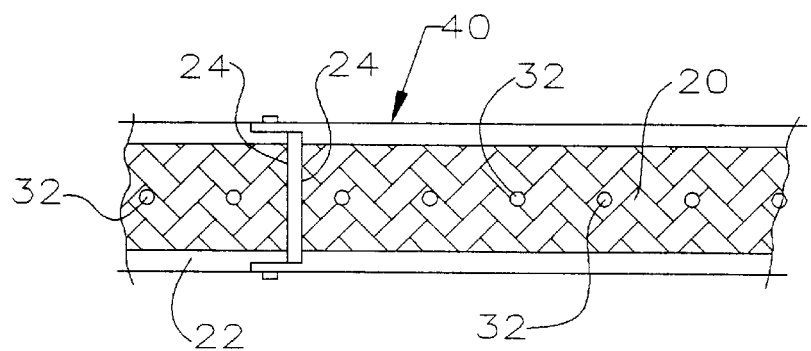
FIG. 13 is a plan view of a portion of the track of FIG. 12.

An alternative embodiment, track 40, is illustrated in FIGS. 11–13. The beads 21 of the used tire 8, that is, the portion of the tire normally engaging the wheel, is severed at regular radial intervals along with a portion of the side wall, thereby enabling the tire to the flexed to a generally linear configuration when severed at a first location 24. The tread portion 20 of tires 8 are left uncut. Rotation of track 16 is normally accomplished through frictional engagement of tires 13 on vehicle drive wheels 12 with track 16.

Also in this embodiment, track 40 may be driven by means of a sprocket instead of by frictional engagement with a vehicle drive wheel. When a sprocket, such as sprocket 34, is to be used, a spaced array of apertures 32 are formed in the tread portion 20 of track 40, at intervals matching the cogs on drive sprocket 34. On an all terrain vehicle where the tensioning wheel is also a drive wheel, sprocket 34 may serve as the track tensioner. The cogs on sprocket 34 engage apertures 32 in the track to provide a non-slip drive mechanism.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A continuous, flexible, looped track for mounting on all terrain vehicle tires comprising:
    a plurality of used tires, a tread surface and sidewalls of each tire of said plurality of used tires being severed through at a first location on each tire so as to form first and second faces on opposite ends of each tire segment so formed when laid flat,
    said tire segments joined together, end to end, to make a continuous flexible track by abutting and joining said second face of a first tire segment to said first face of an adjacent second tire segment and so on in succession joining said plurality of used tires in end-to-end array so as to form said track,
    wherein, an inner circumference of said track is equal to an exterior tangential perimeter distance of said vehicle tires about which said track is to extend, so that, when said array is placed about said vehicle tires, said array snugly frictionally engages said vehicle tires, and said track may be synchronously propelled along with said vehicle tires by driving at least one of said vehicle tires,
    wherein said plurality of used tires are used tires selected from used said all terrain vehicle tires so as to match said track size to said all terrain vehicle tires to thereby assist in said snug frictional engagement of said array with said vehicle tires and further comprising second wheels and corresponding second tires mounted to each of said vehicle wheels for cooperative rotation therewith,
    a second track mounted on said second tires parallel to said track wherein said second track is a second array of tire segments joined end-to-end,
    said second track mounted to said track by fastening of corresponding sidewalls together, for cooperative rotation therewith.

2. A continuous, flexible, looped track for mounting on all terrain vehicle tires comprising:
    a plurality of used tires, a tread surface and sidewalls of each tire of said plurality of used tires being severed through at a first location on each tire so as to form first and second faces on opposite ends of each tire segment so formed when laid flat,
    said tire segments joined together, end to end, to make a continuous flexible track by abutting and joining said second face of a first tire segment to said first face of an adjacent second tire segment and so on in succession joining said plurality of used tires in end-to-end array so as to form said track,
    wherein, an inner circumference of said tack is equal to an exterior tangential perimeter distance of said vehicle tires about which said track is to extend, so that, when said array is placed about said vehicle tires, said array snugly frictionally engages said vehicle tires, and said track may be synchronously propelled along with said vehicle tires by driving at least one of said vehicle tires,
    wherein said plurality of used tires are used tires selected from used said all terrain vehicle tires so as to match said track size to said all terrain vehicle times to thereby assist in said snug frictional engagement of said array with said vehicle tires wherein an abrasion resistant cleat is mounted to said tread surface spaced intervals along said track by u-bolts so as to extend outwardly of said track.

3. A continuous, flexible, looped track for mounting on all terrain vehicle tires comprising:
    a plurality of used tires, a tread surface and sidewalls of each tire of said plurality of used tires being severed through at a first location on each tire so as to form first and second faces on opposite ends of each tire segment so formed when laid flat,
    said tire segments joined together, end to end, to make a continuous flexible track by abutting and joining said second face of a first tire segment to said first face of an adjacent second tire segment and so on in succession joining said plurality of used tires in end-to-end array so as to form said track,
    wherein, an inner circumference of said track is equal to an exterior tangential perimeter distance of said vehicle tires about which said track is to extend, so that, when said array is placed about said vehicle tires, said array snugly frictionally engages said vehicle tires, and said track may be synchronously propelled along with said vehicle tires by driving at least one of said vehicle tires, wherein said plurality of used tires are used tires selected from used said all terrain vehicle tires so as to match said track size to said all terrain vehicle tires to thereby assist in said snug frictional engagement of said array with said vehicle tires wherein said track has a linear, longitudinally extending array of apertures formed therein centrally along said tread surface, spaced so as to be coincident with drive cogs of a drive sprocket.

4. A continuous, flexible, looped track for mounting on all terrain vehicle tires comprising:

a plurality of used tires, a tread surface and sidewalls of each tire of said plurality of used tires being severed through at a first location on each tire so as to form first and second faces on opposite ends of each tire segment so formed when laid flat, said tire segments joined together, end to end, to make a continuous flexible track by abutting and joining said second face of a first tire segment to said first face of an adjacent second tire segment and so on in succession joining said plurality of used tires in end-to-end array so as to form said track, wherein, an inner circumference of said track is equal to an exterior tangential perimeter distance of said vehicle tires about which said track is to extend, so that, when said array is placed about said vehicle tires, said array snugly frictionally engages said vehicle tires, and said track may be synchronously propelled along with said vehicle tires by driving at least one of said vehicle tires, said track further comprising second wheels and corresponding second tires mounted to each of said vehicle wheels for cooperative rotation therewith, a second track mounted on said second tires parallel to said track wherein said second track is a second array of tire segments joined end-to-end, said second track mounted to said track by fastening of corresponding sidewalls together, for cooperative rotation therewith.

5. A continuous, flexible, looped track for mounting on all terrain vehicle tires comprising:

a plurality of used tires, a tread surface and sidewalls of each tire of said plurality of used tires being severed through at a first location on each tire so as to form first and second faces on opposite ends of each tire segment so formed when laid flat, said tire segments joined together, end to end, to make a continuous flexible track by abutting and joining said second face of a first tire segment to said first face of an adjacent second tire segment and so on in succession joining said plurality of used tires in end-to-end array so as to form said track, wherein, an inner circumference of said track is equal to an exterior tangential perimeter distance of said vehicle tires about which said track is to extend, so that, when said array is placed about said vehicle tires, said array snugly frictionally engages said vehicle tires, and said track may be synchronously propelled along with said vehicle tires by driving at least one of said vehicle tires, wherein an abrasion resistant cleat is mounted to said tread surface spaced intervals along said track by u-bolts so as to extend outwardly of said track.

6. A continuous, flexible, looped track for mounting on all terrain vehicle tires comprising:

a plurality of used tires, a tread surface and sidewalls of each tire of said plurality of used tires being severed through at a first location on each tire so as to form first and second faces on opposite ends of each tire segment so formed when laid flat, said tire segments joined together, end to end, to make a continuous flexible track by abutting and joining said second face of a first tire segment to said first face of an adjacent second tire segment and so on in succession joining said plurality of used tires in end-to-end array so as to form said track, wherein, an inner circumference of said track is equal to an exterior tangential perimeter distance of said vehicle tires about which said track is to extend, so that, when said array is placed about said vehicle tires, said array snugly frictionally engages said vehicle tires, and said track may be synchronously propelled along with said vehicle tires by driving at least one of said vehicle tires, wherein said track has a linear, longitudinally extending array of apertures formed therein centrally along said tread surface, spaced so as to be coincident with drive cogs of a drive sprocket.

7. A continuous, flexible, looped track for mounting on all terrain vehicle tires comprising:

a plurality of used tires, a tread surface and sidewalls of each tire of said plurality of used tires being severed through at a first location on each tire so as to form first and second faces on opposite ends of each tire segment so formed when laid flat, said tire segments joined together, end to end, to make a continuous flexible track by abutting and joining said second face of a first tire segment to said first face of an adjacent second tire segment and so on in succession joining said plurality of used tires in end-to-end array so as to form said track, wherein, an inner circumference of said track is equal to an exterior tangential perimeter distance of said vehicle tires about which said track is to extend, so that, when said array is placed about said vehicle tires, said array snugly frictionally engages said vehicle tires, and said track may be synchronously propelled along with said vehicle tires by driving at least one of said vehicle tires, and wherein said inner circumference of said track is not reinforced by cross-members mounted to said inner circumference so that said track shape, for assisting in said frictional engagement of said array with said vehicle tires, is maintained by the unassisted shape of said used tires.

* * * * *